United States Patent Office 3,339,869
Patented Sept. 5, 1967

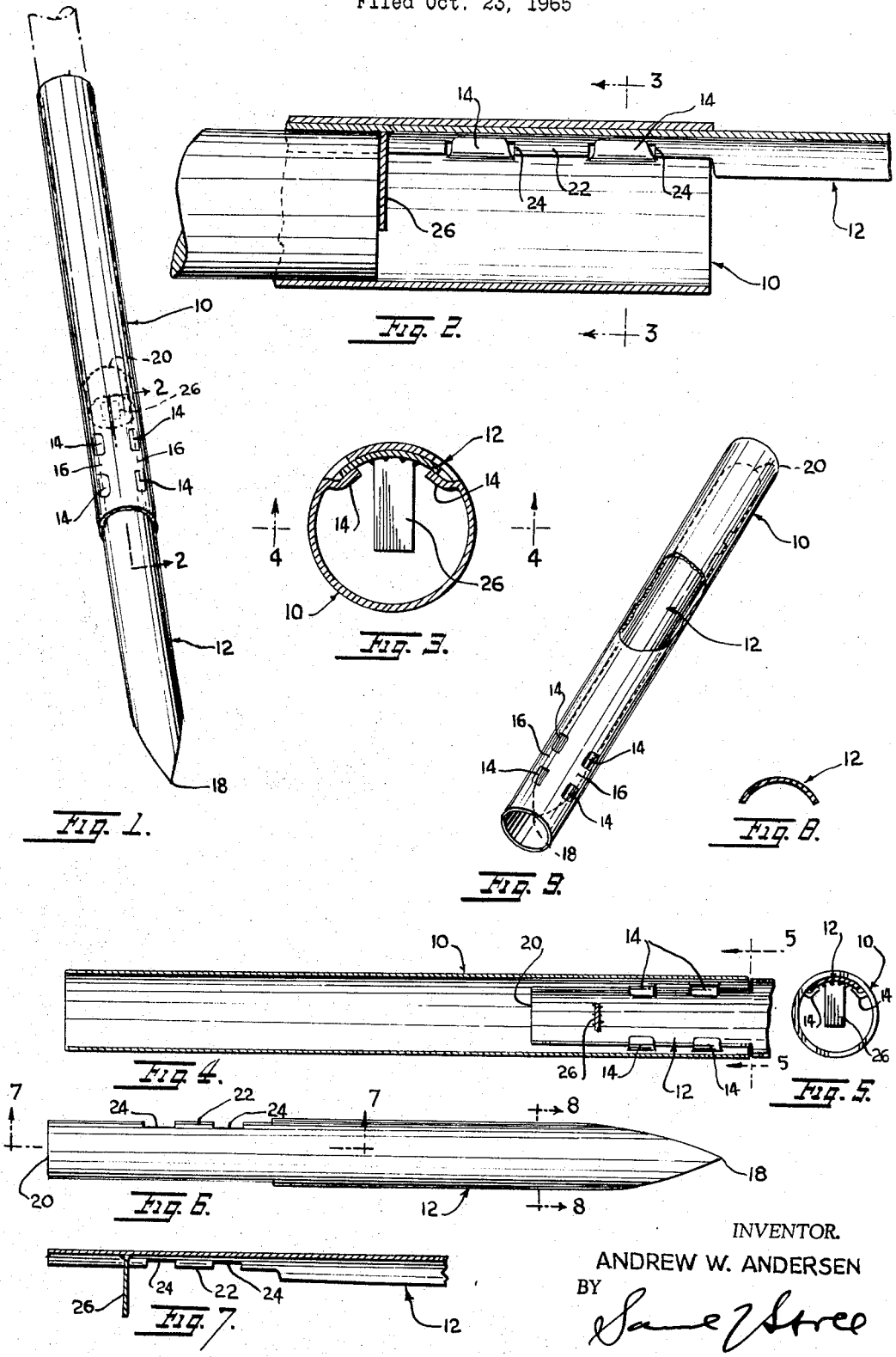

3,339,869
SAND SPIKE HOLDER FOR FISHING RODS
Andrew W. Andersen, 266 Secatogue Lane,
West Islip, N.Y. 11795
Filed Oct. 23, 1965, Ser. No. 503,241
5 Claims. (Cl. 248—48)

This invention relates to a sand spike type of holder for fishing rods and, more particularly, to a device for holding the butt or handle end of a fishing rod, said device being provided with spike means adapted to be driven into beach sand, or the like.

Sand spike type holders for fishing rods are well-known to the art. Essentially, they comprise a tubular holder for the butt end of a fishing rod, and a spike secured to said tubular holder. Manual pressure upon the tubular holder, exerted axially of the spike, will drive the spike into the sand. When this type of device is not in use, its spike may be detached from the tubular holder and in some fashion and by some means the spike may be inserted into and secured to the tubular holder to reduce the overall dimensions thereof for carrying or storing purposes. In all cases known to applicant, however, the pointed end of the spike protrudes from the tubular holder when the spike is inserted into the holder for carrying or other purposes. By definition, this constitutes a hazardous situation and personal injury has been known to occur by reason thereof.

It is the principal object of this invention to provide a sand spike type of fishing rod holder which may be disassembled and its component parts then combined in such manner that the pointed and potentially hazardous end of the spike is contained within the holder and thereby prevented from making contact with the person of the user.

Another important object of this invention is the provision of a sand spike type of fishing rod holder wherein exceedingly simple, inexpensive and fast-acting connecting means are provided between the holder for the fishing rod and the sand spike, said means being the same whether the holder and sand spike are assembled in operative condition, or assembled for carrying or storing purposes.

Another object of the invention is the provision of quick-acting locking means between the holder and the sand spike, preventing accidental detachment of the latter from the former when the device is removed from the sand in which the spike is embedded.

A further object of the invention is the provision of a sand spike type of fishing rod holder of the character described, wherein both the holder and the sand spike, as well as the connecting means between them, are each and all made inexpensively of sheet or tubular material.

In the drawing:

FIGURE 1 is a perspective view of the sand spike holder for fishing rods of the present invention.

FIGURE 2 is a fragmentary side cross-sectional view of the sand spike holder for fishing rods showing the connecting and locking means between the holder and spike portions thereof.

FIGURE 3 is a cross-sectional view as taken across line 3—3 of FIGURE 2.

FIGURE 4 is a cross-sectional view as taken across line 4—4 of FIGURE 3.

FIGURE 5 is an end view as viewed across line 5—5 of FIGURE 4.

FIGURE 6 is a top view of the sand spike portion of the present invention.

FIGURE 7 is a fragmentary cross-sectional view as taken across line 7—7 of FIGURE 6.

FIGURE 8 is a cross-sectional view as taken across line 8—8 of FIGURE 6.

FIGURE 9 is a perspective view of the holder portion of the present invention.

Referring now to the details of the invention as illustrated in the drawing, it will be observed that the sand spike type of fishing rod holder herein claimed comprises a tube 10, a sand spike 12, and the means hereinafter described for connecting the two in either operative or inoperative position.

Turning first to tube 10, which is the holder proper, it will be noted that this tube is preferably cylindrical in shape, its diameter being large enough to accommodate the butt or handle end of a conventional fishing rod, its length being sufficient to support the fishing rod with an adequate mechanical advantage.

By way of illustration, tube 10 may be approximately an inch to an inch-and-a-half in inside diameter and its length may extend from approximately nine to fifteen inches. This, of course, is purely illustrative, and these dimensions form no critical part of the present invention. Also, preferably, the tube should be made of a non-rusting and non-corrosive material such as brass, plated with chromium, nickel or the like. Stainless steel would likewise be suitable for the purpose. The ends of the tube may be plain or rolled, in order to avoid presenting any sharp edges which may constitute potential hazards.

Adjacent one end of the tube, and this would be its lower end when the tube is operationally oriented, is a plurality of lugs 14. In the preferred form of this invention, these lugs are struck out of the wall of the tube and they are offset inwardly therefrom by means of connecting necks 16. These lugs may be considered as belonging to two separate groups, the lugs of one group being disposed opposite the lugs of the other group, at least one of said groups consisting of at least two lugs. In the preferred form of the invention, each group consists of two lugs, making a total of four. Stated differently, each group extends longitudinally of tube 10, a spaced distance from the other group, the distance between the two groups being determined by the effective width of the sand spike 12, as hereinabove more fully described, the distance separating the lugs from the inside wall of the tube being determined by the thickness of the sand spike.

A channel is accordingly formed between the lugs of the inside wall of the tube and also between the connecting necks 16 of each group of said lugs. It will be seen in the drawing that the this channel is adapted to receive either end of the sand spike 12.

The sand spike is arcuate in transverse section, its radius of curvature being slightly less than that of the tube. When the sand spike is inserted into the tube, it occupies a concentric position relative thereto. More specifically, one end 18 of the sand spike is relatively pointed, the opposite end 20 is relatively blunt. However, the arcuate configuration of the sand spike extends, preferably, its full length from its pointed to its blunt end.

In order to connect the sand spike to the tubular holder 10 in operational relationship, the blunt end 20 of the sand spike is inserted axially into the lower end of the tube, between the inside wall of the tube and the lugs 14 which projects therefrom. In other words, the blunt end of the sand spike is inserted into the channel which is defined by the lugs and their connecting necks on the one hand, and the adjacent portion of the inner wall of the tube on the other hand. A small lug or protuberance 22 is formed on sand spike 12, projecting radially outwardly from its convex side. The function of this lug or protuberance 22 is to engage the lower end of tube 10 in order to limit the inward movement of the sand spike into the tube.

A pair of notches 24 is formed in the sand spike 12 along one side edge thereof, adjacent its blunt end 20.

These notches are spaced to correspond to the spacing of lugs 14, and they are sufficiently large to accommodate said lugs in the manner shown in the drawing. The function of these notches will now be described:

It will be understood that on occasion the sand spike will be driven into relatively hard or solidly compacted sand or soil. This would be done by pushing downwardly upon the tube holder 10. When it is desired to remove the sand spike from such compacted sand or soil, the tubular holder 10 would be pulled manually to free the spike therefrom. To avoid premature detachment of said tubular holder from said spike, notches 24 may be employed to engage the adjacent set or group of lugs 14. This may be done by simply rotating the tube until the notches receive the lugs and interlock therewith. The tube may now be pulled with a substantial force sufficient to free the spike from the sand or soil.

When it is then desired to detach the spike from the holder, the holder is rotated in the opposite direction relative to said spike, and the notches and lugs are thereby disengaged. The tubular holder and spike are now free to be moved longitudinally relative to each other in opposite directions, in order to separate the one from the other.

The tubular holder 10 and the spike 12 may now be reassembled for carrying or storage purposes. This time the pointed end 18 of the spike is inserted into tubular holder 10 through the open end of said tubular holder. The pointed end will now engage lugs 14 is precisely the same fashion as the blunt end engaged them when the tubular holder and the spike were assembled into operative relationship. The only portion of the sand spike which will now project from the tubular holder will be its blunt end 20, and this would obviously present far less of a hazard than the pointed end.

One remaining aspect of the foregoing construction remains to be described. In order to prevent the butt or handle end of the fishing rod from dropping or slipping through the tubular holder when said holder is in its operative position, a tongue 26 is provided on the spike 12. In its simplest form, this tongue is struck out of but remains attached to said spike substantially at right angles thereto, extending radially inwardly from the concave side of the spike. This tongue would serve as a floor or bottom wall on which the butt end of the fishing rod would rest. Tongue 26 need not be struck out of the spike, but may constitute a completely separate element added and secured to the spike for the purpose above described. It is immaterial from the point of view of this invention whether the tongue be an integral part of the spike or merely affixed thereto.

The foregoing is illustrative of a preferred form of this invention, and it will be understood that this form may be modified and other forms may be provided within the broad scope of the invention and the claims.

What is claimed is:

1. A fishing rod holder of the character described, comprising a tube which is open at both ends, a spike having one pointed and one blunt end, a plurality of lugs provided on the inside wall of said tube in spaced relation thereto, said lugs being arranged in two oppositely disposed groups forming a channel between them, each end of said spike being shaped and proportioned to enter said channel and to engage between said lugs and the adjacent portions of the inner wall of the tube, whereby a friction fit is provided to secure the spike to the holder.

2. A fishing rod holder in accordance with claim 1, wherein the tube is generally cylindrical in shape and the spike is arcuately shaped in transverse section, the radius of curvature of said spike being smaller than the radius of curvature of the tube, said spike being adapted when inserted into said tube of engagement with said lugs, to assume a concentric position relative to the tube.

3. A fishing rod holder in accordance with claim 2, wherein the lugs are struck out of the wall of the tube, there being two lugs in each of said group of lugs to engage the spike at four spaced points thereon.

4. A fishing rod holder in accordance with claim 3, wherein the spike is provided with a pair of notches formed along one side edge thereof adjacent its blunt end, said notches being shaped, dimensioned and spaced to correspond substantially to the dimensions and space of each pair of lugs, whereby said holder may be rotated relative to the spike about the longitudinal axis of said holder and said spike to lock one pair of said lugs into said pair of notches in order to prevent disengagement of the holder from the spike when the spike is securely anchored in the ground and it is desired to remove the spike from the ground by pulling manually upon the holder.

5. A fishing rod holder in accordance with claim 4, wherein a tongue is attached to the wall of the spike adjacent its lugs, said tongue projecting inwardly from said wall and serving as a support for the butt of a fishing rod inserted therein.

References Cited
UNITED STATES PATENTS

| | | | |
|---|---|---|---|
| 1,577,612 | 3/1926 | Dees | 248—38 |
| 2,451,363 | 10/1948 | Sonner | 248—46 |
| 2,665,866 | 1/1954 | Goldinger | 248—46 |

FOREIGN PATENTS

| | | |
|---|---|---|
| 409,449 | 5/1934 | Great Britain. |

JOHN PETO, *Primary Examiner.*